United States Patent
LaFreniere (10) Patent No.: US 12,172,738 B2
(45) Date of Patent: Dec. 24, 2024

(54) SHARK-PROOF APPAREL COMPRISING AN ELECTROMAGNETIC-BASED SHARK REPELLENT SYSTEM

(71) Applicant: Zakariah LaFreniere, Miami, FL (US)

(72) Inventor: Zakariah LaFreniere, Miami, FL (US)

(73) Assignee: Zakariah LaFreniere, Miami, FL (US)

( * ) Notice: Subject to any disclaimer, the term of this patent is extended or adjusted under 35 U.S.C. 154(b) by 167 days.

(21) Appl. No.: 17/714,991

(22) Filed: Apr. 6, 2022

(65) Prior Publication Data

US 2022/0322760 A1   Oct. 13, 2022

Related U.S. Application Data

(60) Provisional application No. 63/172,273, filed on Apr. 8, 2021.

(51) Int. Cl.
| | |
|---|---|
| B63C 9/00 | (2006.01) |
| A01M 29/24 | (2011.01) |
| H01Q 1/27 | (2006.01) |
| B63C 11/04 | (2006.01) |

(52) U.S. Cl.
CPC .............. *B63C 9/00* (2013.01); *A01M 29/24* (2013.01); *H01Q 1/273* (2013.01); *B63C 2009/0017* (2013.01); *B63C 2009/0088* (2013.01); *B63C 11/04* (2013.01); *B63C 2011/046* (2013.01)

(58) Field of Classification Search
CPC ... B63C 9/00; B63C 11/04; B63C 2009/0017; B63C 2009/0088; B63C 2011/046; B63C 2011/043; A01M 29/24; H01Q 1/273; A41D 13/012; A41D 1/002
See application file for complete search history.

(56) References Cited

U.S. PATENT DOCUMENTS

| | | | |
|---|---|---|---|
| 4,211,980 | A | 7/1980 | Stowell |
| 5,496,300 | A | 3/1996 | Hirsch et al. |
| 6,452,553 | B1 | 9/2002 | Cohen |
| 6,837,182 | B2 | 1/2005 | Leblanc |
| 7,004,806 | B1 | 2/2006 | Schneider |

(Continued)

FOREIGN PATENT DOCUMENTS

| | | | | |
|---|---|---|---|---|
| WO | WO-2007106230 A2 | * | 9/2007 | ............ A01K 79/02 |
| WO | WO-2016191687 A1 | * | 12/2016 | ........... A61B 5/0205 |
| WO | WO-2018107202 A1 | * | 6/2018 | |

OTHER PUBLICATIONS

Ocean Guardian Freedom7, Powered by Shark Shield Technology, https://ocean-guardian.com/products/freedom7, downloaded from Internet Jul. 5, 2022, 4 pages.

(Continued)

*Primary Examiner* — Seung H Lee
(74) *Attorney, Agent, or Firm* — John L. DeAngelis; Wolter Van Dyke Davis, PLLC (57) ABSTRACT

A garment to repel underwater aquatic creatures. A first component for generating a control signal and a second component for receiving the control signal and transmitting an electromagnetic signal responsive thereto, an electromagnetic field created by the electromagnetic signal radiating from the second component into an aquatic area surrounding the garment. A water sensor disposed on the garment for activating the first and second components to transmit the electromagnet signal when the water sensor senses presence of water.

17 Claims, 7 Drawing Sheets

(56) References Cited

U.S. PATENT DOCUMENTS

| | | |
|---|---|---|
| 7,233,829 B2 | 6/2007 | Vlad |
| 7,310,549 B1 | 12/2007 | Angelini et al. |
| 7,830,319 B2 * | 11/2010 | Cohen ........................ H01Q 9/16 |
| | | 343/718 |
| 7,924,165 B2 | 4/2011 | Vinano, Jr. et al. |
| D667,911 S | 9/2012 | Barbis |
| 8,456,310 B2 | 6/2013 | Becker |
| 8,975,769 B2 | 3/2015 | Bahadik et al. |
| 8,988,226 B2 | 3/2015 | Vinano et al. |
| 9,108,707 B2 | 8/2015 | Pradeep |
| 10,537,095 B2 | 1/2020 | Harrick et al. |
| 11,345,447 B2 * | 5/2022 | Bell ........................ B63B 45/02 |
| 2005/0197686 A1 | 9/2005 | Vlad |
| 2006/0119525 A1 | 6/2006 | Cohen et al. |
| 2010/0271187 A1 | 10/2010 | Uysal et al. |
| 2011/0174235 A1 | 7/2011 | Vinano et al. |
| 2013/0091610 A1 | 4/2013 | Hennessey, IV |
| 2017/0033448 A1 | 2/2017 | Cohen |

OTHER PUBLICATIONS

Shark Shield Technology, Ocean Guradian, https://ocean-guardian.com/pages/shark-shield-technology, downloaded from Internet Jul. 5, 2022, 3 pages.

* cited by examiner

SHARK-PROOF APPAREL COMPRISING AN ELECTROMAGNETIC-BASED SHARK REPELLENT SYSTEM

CROSS REFERENCE TO RELATED APPLICATIONS

The present application claims priority under 35 U.S.C. 119(e) to the provisional patent application filed on Apr. 7, 2021 and assigned application No. 63/172,273. That application is incorporated herein in its entirety.

BACKGROUND OF THE INVENTION

In 1945, toward the end of World War II, an American cruiser named the U.S.S. Indianapolis was sunk by a pair of torpedoes fired from an Imperial Japanese Navy 1-58 submarine in the south Pacific Ocean. Out of the 1,196 men on board, about 300 immediately died upon torpedo impact and went down with the ship; the U.S.S. Indianapolis sank in about twelve minutes. About 896 sailors and airmen entered the Philippine Sea. After four days in the open ocean of the 900 crew members of the Indianapolis that went into the water wearing only kapok jacket personal flotation devices, only 316 sailors were discovered alive by aerial search and rescue.

According to survivor witness testimony, like U.S. Marine Sgt. Edgar Harrell, many of the Naval sailors and aviators who perished awaiting aerial search and rescue over four days, died from ambush shark attack. The military issued kapok life-vests provided for Naval personnel provided ample flotation; however, the sailors and aviators were still vulnerable to ambush shark attack. The U.S.S. Indianapolis disaster was recounted in the 1975 movie Jaws directed by Steven Spielberg, and represents the single greatest maritime loss of life from shark attack in history.

The U.S. military in general, and the U.S. Navy in particular, continues to engage in various operations at sea that place servicemembers at risk of ambush shark attack. The U.S. Navy has been seeking an effective shark deterrent for servicemembers for many decades. For example, F-35C pilots aboard the U.S.S. Ronald Reagan nuclear powered aircraft carrier commonly engage in military operations over shark infested waters. In the event that a Navy pilot is forced to eject from his or her aircraft, that pilot may be vulnerable to a shark attack while awaiting aerial search and rescue in the open ocean.

Also, Navy SEAL teams regularly engage in military missions from nuclear submarines in shark infested waters, and would benefit greatly from new military issued protective gear (e.g. wetsuit/dry suits) that afforded greater protection from ambush shark attack. In short, Navy servicemembers operating in any shark infested domain, could be far more effective at accomplishing the mission, if issued protective gear that increased their protection from shark attacks.

Since 1850, the United States has led the world in recorded shark attacks at around 1,516. That said, civilian embodiments of the Shark Proof Apparel could benefit those such as spear-fishers, triathletes, marine biologists, wet welders, life-guards, and the like. There is, therefore, a defined need for an improved apparatus and method for protecting vulnerable individuals from shark attacks. The apparatus is expedient in both military and civilian applications and raises the level of protection from shark attacks.

DETAILED DESCRIPTION OF THE PREFERRED EMBODIMENTS

A shark proof apparel including a shark repellent system is provided to prevent or reduce the number of shark attacks upon military and civilian personnel operating in environments where sharks may be present. The system of the invention comprises a garment or apparel item configured to be worn by an individual. The bi-lateral electromagnetic shark repellent system for generating an electromagnetic field is embedded within the garment. See FIGS. 2-4 as exemplars.

In one embodiment the electromagnetic fields radiate in all directions from the garment wearer (omnidirectionally) and are controlled by pulse signals. Specifically, the fields radiate from shoulder-mounted antennas (dipole or monopole) and from bilateral fractal pattern antennas. The fields are also radiated from the antennas (monopole or dipole) near the ankle of the wearer. In one embodiment the fields exhibit a pulse-like form as they radiate from the various antennae of the present invention.

Each low frequency pulse, with a pulse frequency of about 40 Hertz, generates an isotropic omnidirectional electromagnetic field to repel an approaching great white shark at about four meters radius from the wearer.

In another embodiment, the pulses are generated randomly and intermittently and transmitted to generate the electromagnetic field.

Also, in one embodiment the invention comprises two redundant shark repellent systems that can be activated concurrently or independently. Each one of the two systems can be controlled to transmit the repelling electromagnetic radiation from one or more of the antennae associated with each system.

Figure 1:
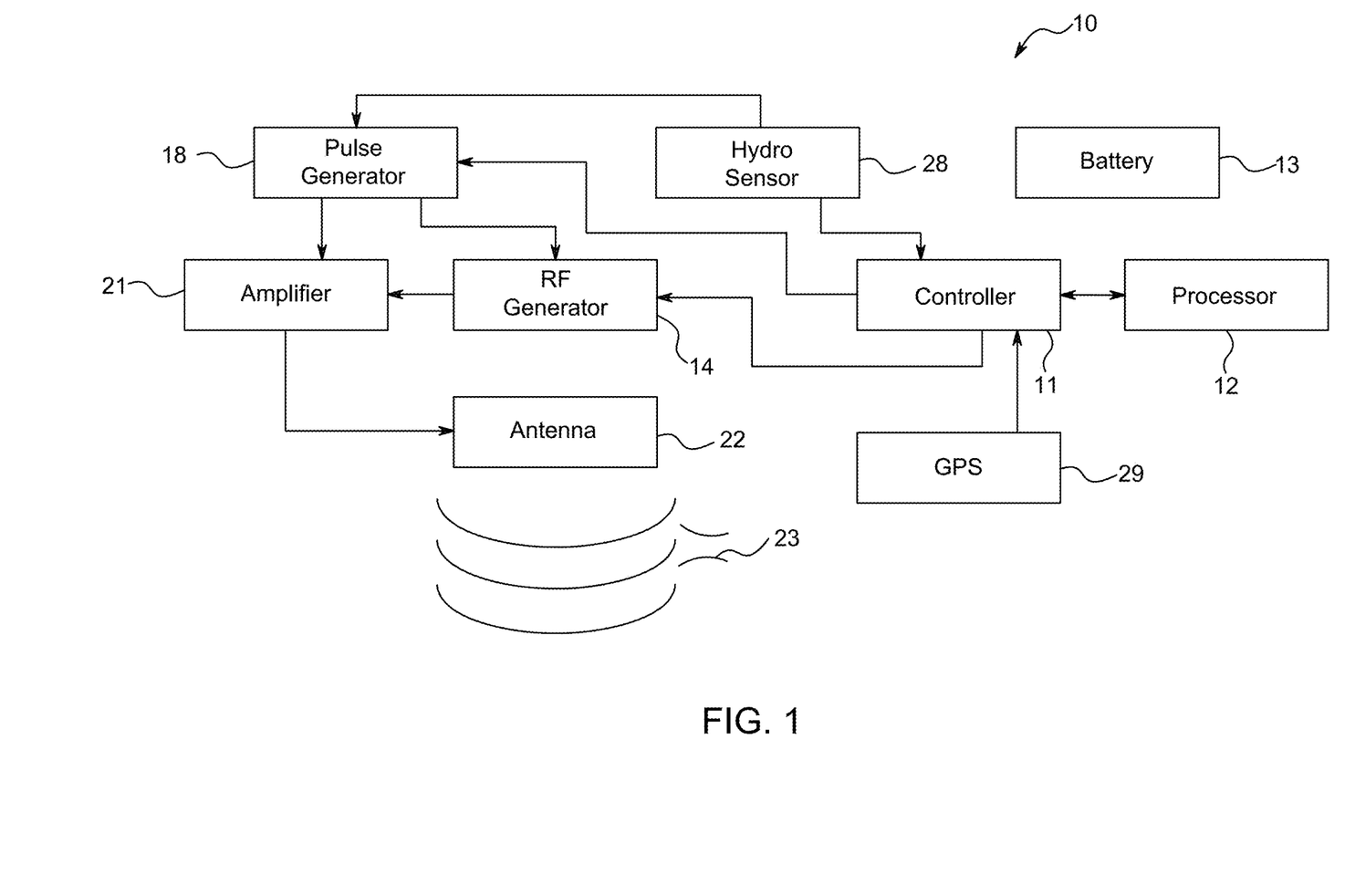
FIG. 1 shows a block diagram of a shark repellent system according to the teachings of the invention.

FIG. 1 illustrates a block diagram of a shark repellent system 10. The system comprises a system controller 11 and a signal generator 14 for generating signals under control of a pulse generator 18. When a pulse is input to the generator 14, the generator produces a signal for input to an amplifier 21 and then to an antenna 22. During intervals between pulses no signal is generated and thus no signal is transmitted from the antenna 22. The antenna 22 emits electromagnetic waves, depicted by field lines 23.

The system further includes an artificial intelligence/machine learning algorithm, as described further herein, that is executed by a processor 12.

The controller 11 is activated responsive to a signal from one or more water sensors (e.g., hydro sensors) 28. Typically, the sensors are mounted on or integrated with the flight suit, wet suit, or vest. The sensors detect the presence of water when the garment to which they are attached or integrated into, is submerged in water.

Responsive to the water sensors 28 the controller activates the pulse generator 18 and/or the RF generator 14 for generating the signals radiated from the antenna 22

The controller operates in one of a manual, ON, or OFF mode. The mode is selected by user operation of one or more controls (not shown).

In the OFF mode no electromagnetic signals are transmitted from the antenna 22. This mode may be used, for example, to avoid detection when a Navy Seals team is performing a covert operation.

In the manual mode, the user controls the system to activate (or terminate) emissions of the electromagnetic field. Specifically, in this mode the user/wearer can control the system to issue a single pulse or many pulses as desired.

The ON mode is the system default. When one or more of the hydro sensors detects the presence of water (i.e., submerged) each of the various bilateral antennas transmit. While in the ON mode, the transmissions continue for the life of the battery.

For example, if a pilot is stranded at sea for a long period, he/she may decide to switch to manual mode and control the system so that antenna(s) on one side of the garment transmit for a few hours; then turn the system to OFF mode for a few hours. Then activate again (perhaps switching to the antennas on the other side of the suit/vest) until the battery is completely discharged.

A GPS unit 29 determines and records the location of the system, and of course the person wearing the garment.

A battery 13 supplies power to the various elements of the system. The battery comprises a lithium ion battery or a graphene battery. The battery can be charged via a wireless or wired connection to a recharging device (not shown).

Although only one antenna is illustrated in FIG. 1 block diagram, according to a preferred embodiment, the bilateral electromagnetic pulse system includes two fractal pattern antennas as further described herein and two or more dipole or monopole antennae.

One embodiment of the invention comprises a single system as illustrated in FIG. 1 for supplying signals to all antennae. A preferred embodiment comprises a second redundant system identical to the system of FIG. 1. One system supplies the signal for transmission to the antennae on the wearer' right side (34A, 38A, and 42A), and a second system supplies the signal for transmission to the antennae on the wearer's left side (34B, 38B, and 42B). The two systems can be controlled for concurrent or independent operation.

With two redundant systems, the other elements in FIG. 1 are also duplicated in both systems, e.g., two GPS units, two hydro sensors. two batteries (e.g., two lithium ion batteries). One battery supplies power to the first system and the elements thereof and the second battery supplies power to the elements of the second system. Such an embodiment doubles the time during which shark-repelling transmissions can be transmitted.

Figure 2:
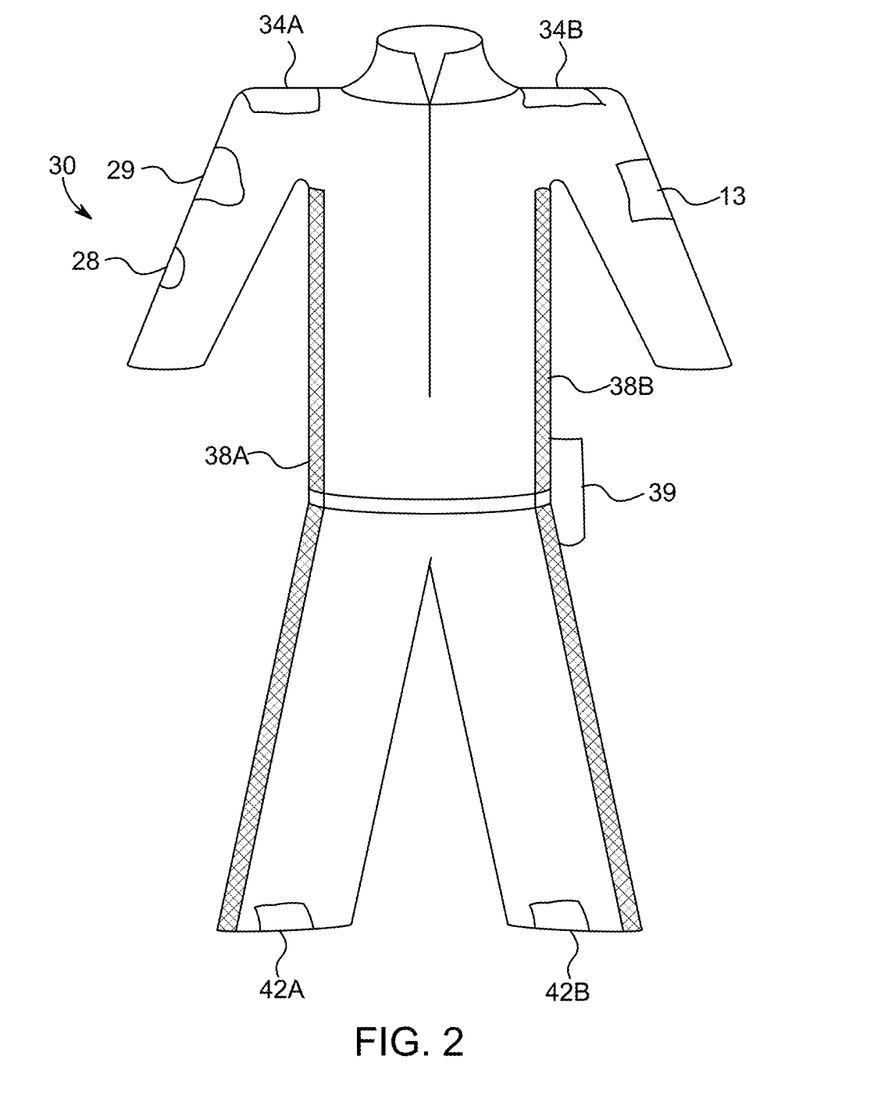
FIG. 2 shows one embodiment of a shark proof apparel flight suit embodying the shark repellent system of FIG. 1.

Referring now to FIG. 2, there is shown a shark repellent flight suit 30 with the shark repellent system of FIG. 1 integrated with the suit or disposed on or within the suit.

The suit 30 comprises two bilateral shoulder-mounted antennae 34A and 34B. In one embodiment each antenna comprises a dipole or a monopole antenna. These antennae are in addition to or in lieu of the single antenna 22 illustrated in the system block diagram of FIG. 1.

The suit 30 further comprises two bilateral fractal pattern antennae 38A and 38B (also known as fractal antennae) for more effective generation of electromagnetic fields in a smaller surface area; again, the fractal pattern antennae are in lieu of or in addition to the antenna 22 illustrated in FIG. 1.

As is known by those skilled in the art, a fractal antenna is an antenna that uses fractal, self-similar geometrical designs, such as the "Minkowski fractal" or the "Sierpinski triangle" to maximize its radiation efficacy. Generally, a fractal antenna comprises a motif that repeats over two or more scale sizes or iterations. Such antennas are generally considered wideband in that the fractal antenna can create radiating fields over a wide frequency range.

Figure 5:
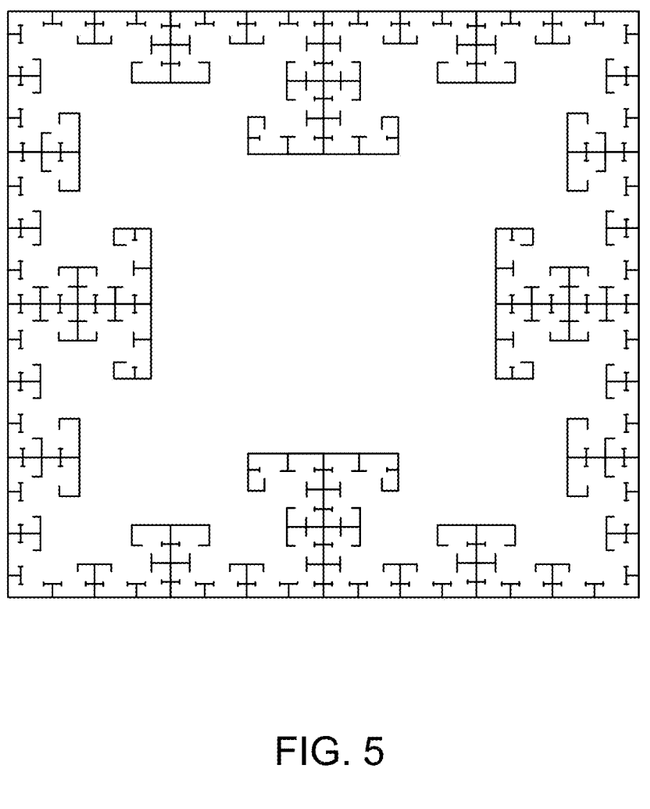
FIG. 5 shows an exemplary fractal antenna for use with the shark repellent system of the present invention.

As depicted, in one embodiment the fractal antennae 38A and 38B each comprise a T-square fractal as illustrated in FIG. 5. In any case, each fractal antenna extends about five feet or 60" bilaterally from a shoulder region to an ankle region of the garment.

The controller 11 (and the processor 12 and the battery 13) can be separately mounted, as for example within an enclosure 39 illustrated in FIG. 2. In another embodiment, the battery can be mounted proximate one of the shoulder-mounted antennae 34A and 34B. Or in yet another embodiment may be mounted at a different location on an interior-facing surface of the garment or between the interior and exterior facing surfaces of the garment.

Additionally, yet another dipole or monopole antenna 42A and 42B can be disposed at the far end of each the fractal antennae 38A and 38B, i.e., proximate the wearer's ankle.

Different embodiments may comprise any number of the various antennae illustrated in FIG. 2. Preferred antenna types have been described herein, but those skilled in the art are aware that other radiating devices may be used in lieu of the stated antennae.

The elements of the shark repellent system are powered by the rechargeable lithium ion power source 13 disposed on or within the garment at any convenient location, such that all devices in the system of FIG. 1 can be easily connected to the power source. FIG. 2 identifies one possible location on the garment 10. Alternatively, the battery is enclosed within the water proof enclosure 39. The battery can be recharged by conventional techniques known to those skilled in the field.

In another embodiment the power source comprises a graphene-based battery.

FIG. 2 also depicts the hydro or water sensor 28 that activates the system when the sensor is submerged in water. Alternatively, the hydro sensor can be disposed within the enclosure 39 with an active surface of the sensor exposed to detect the presence of water surrounding the suit 30. More than one hydro sensor may be present in certain embodiments of the invention.

FIG. 2 also depicts the GPS 29 disposed on the suit 30. Other locations on the suit are suitable for the GPS. Preferably, the GPS is housed inside a water tight encasement within the garment or on an exterior surface of the garment.

As described above, one embodiment of the present invention includes two systems with one such system presented in FIG. 1. Clearly, in an embodiment of two systems, the various elements of the second system must be appropriately located on the suit 30. Further, in the event that one of the systems fails (e.g., the battery associated with that system is completely discharged), the redundant system can be activated to generate shark repelling electromagnetic signals.

In yet another embodiment, the various system antennae associated with the first system can receive a signal for transmission from the second system. This provides additional redundancy than a two-system embodiment wherein each system can supply signals to only the antenna associated with that system. Thus, in the event one antenna is not functional for any reason, another antenna can serve as a backup. Also, both systems can be concurrently activated by the user, but this may not be necessary given the duplicate radiation patterns of the antennas and the unnecessary battery discharge with two operable systems.

Figure 3:
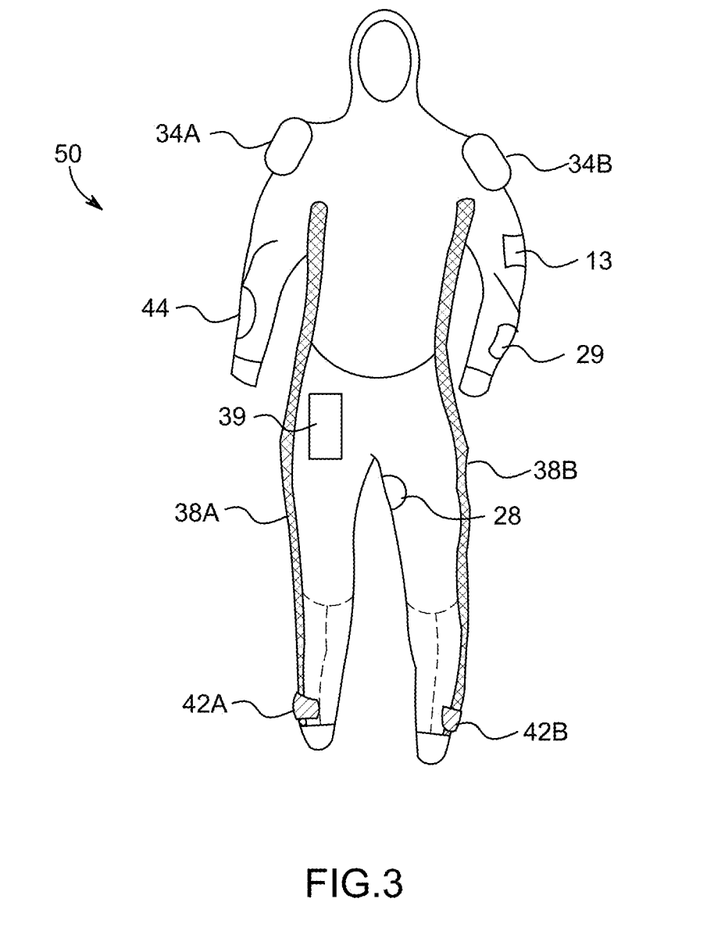
FIG. 3 shows one embodiment of a shark proof apparel wet suit embodying the shark repellent system of FIG. 1.

Referring now to FIG. 3, there is shown a shark proof life wet suit 50 that includes the shark repellent system of the present invention. The elements identified in FIG. 3 with like reference numerals from other figures, have the same function and operation as described in conjunction with other figures of the present application. Also, the dual system embodiment can be utilized with the wet suit 50 embodiment.

The "wetsuit/dry suit embodiment" is designed for use by a diver in a cold-water environment. Structurally, the dry suit is configured to fully cover the diver and to prevent water from penetrating into the interior region of the dry suit.

Figure 4:
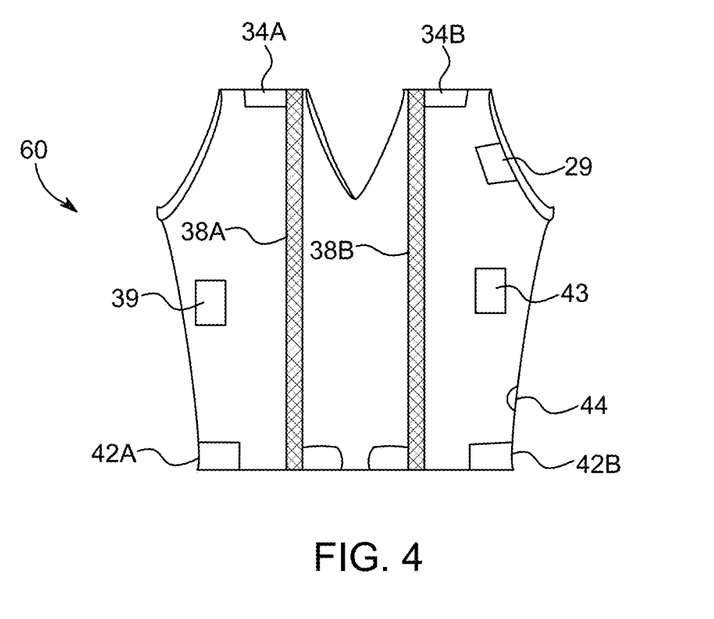
FIG. 4 shows a life vest embodying the shark repellent system of FIG. 1.

Referring now to FIG. 4, there is shown a shark proof life vest 60 that includes the shark repellent system of the present invention. The shark proof life vest comprises an inflation mechanism (not shown) such as those embedded into a traditional life vest. As such, the shark proof life vest provides buoyancy to suspend the wearer while in a body of water.

The reference numerals in FIG. 4 refer to the same elements with the same functionality as in FIGS. 1, 2 and 3. Although certain locations for these elements have been depicted, those skilled in the art are aware that the elements can be relocated to other locations on the life vest 60 and further disposed on an interior or exterior facing surface (as appropriate) or within the vest.

In one embodiment, a singular integrated shark repellant system and its constituent components is placed on or within the shark proof life vest. However, in alternative embodiments, a plurality of such shark repellent systems may be utilized. In the illustrated embodiment, the system elements are in operable connection with one or hydro sensors 44, such that the system is activated in the presence of water.

Also, the dual system embodiment described herein can be utilized with the vest 60.

Referring now to FIG. 5, there is shown a T-square fractal antenna suitable for use with the shark repellent system as the antenna 22 in FIG. 1 or the fractal antennae 38A and 38B as depicted in the various embodiments of the system.

Although the present system has been described as emitting a signal in the frequency range of about 20 to 60 Hz, according to another embodiment a detection system determines one or more of the size, speed, and breed of the shark and based thereon an artificial intelligence/machine learning algorithm (executed by the processor 12) determines an appropriate frequency (possibly outside the 20-60 Hz range) and other signal parameters for emission by the shark repellent system. If the signal is transmitted in a pulse-like form, the time between pulses (i.e., the pulse waveform period or the duty cycle) is variable and again as determined by the algorithm. Additionally, the algorithm continues to adjust the signal parameters as determined by a distance between the wearer and the shark.

Additionally, the algorithm stores data of each shark encounter by any user of the system of the invention. Thus, the shark repellent system records every encounter with a shark, including various encounter-related metrics, such as shark size, approach speed and approach angle. The data accumulates over time as more system users experience more shark encounters. The primary data recording algorithm uses an artificial intelligence/machine learning (AI/ML) algorithm to control the electromagnetic radiation to more effectively repel sharks.

Thus, rather than limited to one signal frequency, the system employs the AI/ML algorithm to generate a signal with more effective parameters to more likely repel a shark.

The signal emitted from the antennae of the system may take any one of several formats, as each may be effective in repelling sharks in specific circumstances. Such signal formats are depicted in FIGS. 6A, 6B, and 6C.

Figure 6A:
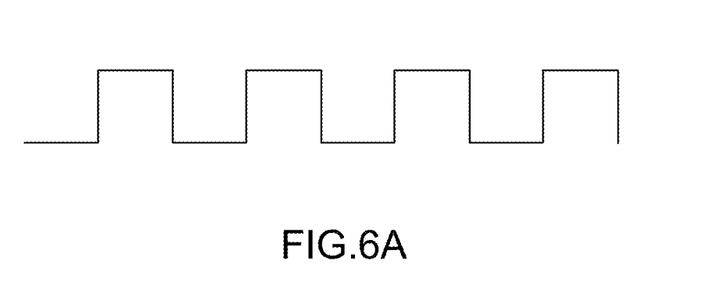
FIGS. 6A, 6B, and 6C show several waveforms that the shark repellent system of the present invention can transmit to repel sharks.

FIG. 6A illustrates a pulse waveform with a 50% duty cycle and a representative frequency in a 20 to 60 Hz range. The frequency and pulse duty cycle are variable under control of the processor or controller, which in turn, in one embodiment, is controlled by the user or by the AI/ML algorithm. The duty cycle can vary between about 10% and 90% and the frequency can vary between about 10 Hz and about 100 MHz.

Figure 6B:
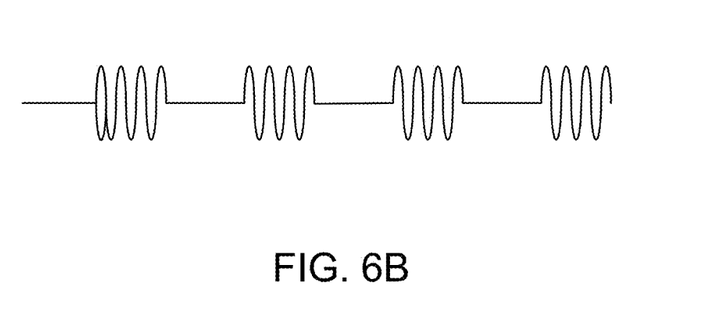

FIG. 6B illustrates radio frequency (RF) pulses where the pulse-like envelope of the RF signal has characteristics as described in FIG. 6A. The radio frequency signal has a frequency between about 20 Hz and about 100 MHz.

Figure 6C:
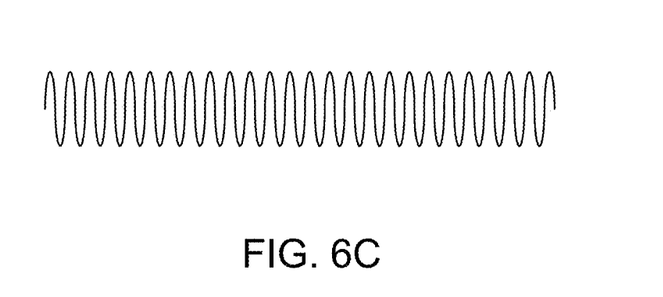
Figure 7:
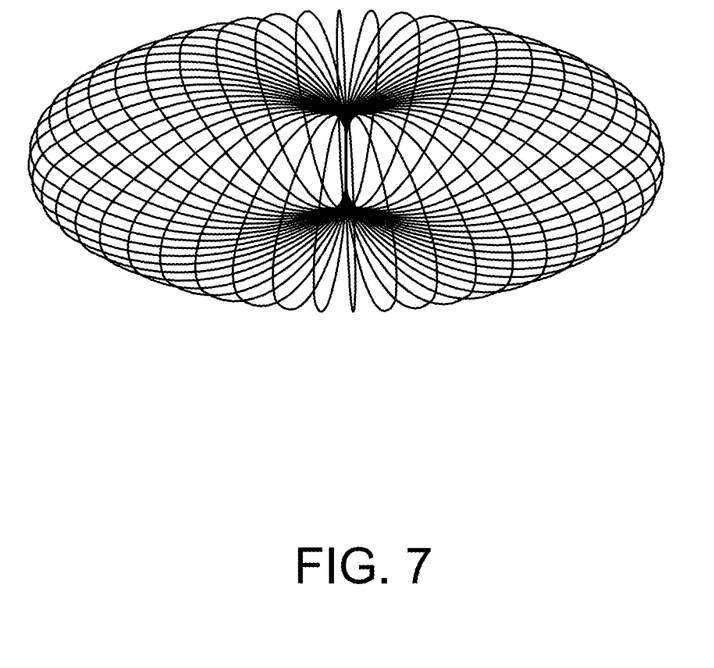
FIG. 7 shows a radiation pattern for a fractal antenna such as the fractal antenna for use with the present invention.

FIG. 6C illustrates a continuous sinusoidal signal have a frequency between about 20 Hz and about 100 MHz.

The use of other waveforms and other frequencies, such as triangle and sawtooth waveforms are also contemplated by the present invention.

It is known that certain electromagnet frequencies are effective in deterring great white sharks, according to shark expert marine biologist Dr. Carl Meyer at the Hawaii Institute of Marine Biology. One such frequency is about 40 Hertz. Other references suggest a frequency of about 20 Hz or less. One embodiment of the present invention uses a frequency of less than about 300 Hertz.

The various described garments embodying the inventive shark repellent system may be made of any suitable material, including currently used materials such as cotton, hemp, leather, steel and aluminum. Additionally, the present invention may be implemented on any number of garments of different structures and materials. Specific garment measurements vary to fit the body shape and size of the wearer.

Also, the various described elements of the system may be disposed on an exterior or interior surface of the garment or between the interior and exterior surfaces. Although the figures depict certain locations for the system elements, those skilled in the art are aware that the elements can be relocated to other locations on the garment.

The foregoing descriptions of specific embodiments of the present invention have been presented for purposes of illustration and description. They are not intended to be exhaustive or to limit the present invention to the precise forms disclosed, and obviously many modifications and variations are possible in light of the above teachings. The exemplary embodiments are chosen and described in order to best explain the principles of the present invention and its practical application, to thereby enable others skilled in the art to best utilize the present invention and various embodiments with various modifications as are suited to the particular use contemplated.

What is claimed is:

1. A garment for wearing by a human for repelling underwater aquatic creatures, a system disposed on or in the garment, the system comprising:
   a first component for generating a control signal;
   a second component for receiving the control signal and transmitting an electromagnetic signal responsive thereto, an electromagnetic field created by the electromagnetic signal radiating from the second component into an aquatic area surrounding the garment;

a water sensor disposed on the garment for activating the first and second components to transmit the electromagnet signal when the water sensor senses presence of water;

wherein the second component comprises a monopole antenna, a dipole antenna or a fractal antenna; and wherein the fractal antenna comprises a first and second fractal antenna, each disposed laterally right and left relative to a body midline and extending from proximate a shoulder region to proximate a foot region.

2. The garment of claim 1, further comprising a life vest, a flight suit, a wet suit, or a dry suit.

3. The garment of claim 1, wherein a frequency of the electromagnetic signal is between about 20 Hz and 60 Hz.

4. The garment of claim 1, wherein the first and second fractal antennae each comprises a T-square fractal antenna.

5. The garment of claim 1, wherein the monopole antenna or the dipole antenna comprises a first and a second monopole antenna or a first and second dipole antenna each disposed in respective right and left shoulder regions of the garment.

6. The garment of claim 1, wherein the monopole antenna or the dipole antenna comprises a first and a second monopole antenna or a first and a second dipole antenna each disposed in respective right and left ankle regions of the garment.

7. The garment of claim 1, wherein the second component comprises a plurality of antennae each disposed at a different location on the garment.

8. The garment of claim 1, further comprising a GPS device for determining a location of the garment.

9. The garment of claim 1, further comprising a rechargeable lithium ion battery for supplying power to the first and second components and the water sensor.

10. The garment of claim 1, wherein the electromagnetic signal comprises a square wave with a frequency in a range of about 20 Hz to 80 Hz, or a radio frequency signal with a frequency in a range of about 20 Hz to 100 MHz with a pulse-like envelope, or a sinusoidal signal with a frequency in a range of about 20 Hz to 100 MHz.

11. The garment of claim 1, wherein the electromagnetic signal comprises a square, triangle, sinusoidal, or sawtooth waveform.

12. The garment of claim 1, wherein the system comprises a first system, and the garment further comprises a second system, the first and second systems each comprising a first component, a second component, and a water sensor.

13. The garment of claim 12, wherein the first and second systems operate according to a manual mode, an ON mode, and an OFF mode.

14. The garment of claim 13, wherein in the manual mode a user independently controls the first and second systems to activate and terminate emissions of the electromagnetic signal from either of both of the first and second systems.

15. The garment of claim 13, wherein in the ON mode the electromagnetic signal is transmitted continuously from one or both of the first and second systems.

16. A garment for wearing by a human for repelling underwater aquatic creatures, a system disposed on or in the garment, the system comprising:

a first component for generating a control signal;

a second component for receiving the control signal and transmitting an electromagnetic signal responsive thereto, an electromagnetic field created by the electromagnetic signal radiating from the second component into an aquatic area surrounding the garment;

a water sensor disposed on the garment for activating the first and second components to transmit the electromagnet signal when the water sensor senses presence of water; and wherein the system comprises a detection system for determining one or more of a size, speed, and breed of a shark and based one on or more of size, speed, and breed, an artificial intelligence/machine learning algorithm determines an appropriate frequency for the electromagnetic signal.

17. A garment for wearing by a human for repelling sharks, the garment comprising:

a first and a second shark repellent system, each further comprising:

a power source;

a first and a second bilateral fractal pattern antenna each extending along a side surface of the garment and each radiating an electromagnetic wave with a frequency between 20 Hz and 80 Hz;

a third and a fourth bilateral antenna each mounted proximate an ankle region of the garment;

a fifth and a sixth bilateral antenna each mounted proximate shoulder region of the garment;

each of the first and second fractal antennae, and the third, fourth, fifth, and sixth antennae transmitting a signal in a frequency range of between 20 Hz and 60 Hz;

a rechargeable lithium ion battery for supplying power to elements of the first and second shark repellent systems;

a water sensor disposed on the garment for activating one or both of the first and second systems when the water sensor senses presence of water.

* * * * *